United States Patent
Flaig et al.

[19]

[11] Patent Number: 6,152,404
[45] Date of Patent: Nov. 28, 2000

[54] APPARATUS FOR INFLUENCING A WING ROOT AIRFLOW IN AN AIRCRAFT

[75] Inventors: Axel Flaig, Reessum; Detlev Schwetzler, Delmenhorst; Ulrich Stache, deceased, late of Bremen, all of Germany, by Ronald Seiler, legal representative

[73] Assignee: DaimlerChrysler Aerospace Airbus GmbH, Hamburg, Germany

[21] Appl. No.: 09/078,292

[22] Filed: May 13, 1998

[30] Foreign Application Priority Data

May 13, 1997 [DE] Germany .............................. 197 19 922

[51] Int. Cl.[7] .................................................. B64C 23/06
[52] U.S. Cl. ............................ 244/199; 244/214; 244/130
[58] Field of Search ................................... 244/214, 213, 244/199, 200, 130

[56] References Cited

U.S. PATENT DOCUMENTS

| | | |
|---|---|---|
| 2,927,749 | 3/1960 | Brownell . |
| 3,486,720 | 12/1969 | Seglem et al. . |
| 3,968,946 | 7/1976 | Cole . |
| 4,032,087 | 6/1977 | Cleaves . |
| 4,384,693 | 5/1983 | Pauly et al. . |
| 4,471,925 | 9/1984 | Kunz . |
| 4,477,042 | 10/1984 | Griswold . |
| 4,595,160 | 6/1986 | Santos . |
| 4,702,441 | 10/1987 | Wang . |
| 4,714,215 | 12/1987 | Jupp et al. . |
| 5,249,762 | 10/1993 | Skow . |
| 5,992,793 | 11/1999 | Perry et al. . |

FOREIGN PATENT DOCUMENTS

| | | | |
|---|---|---|---|
| 285492 | 1/1981 | Japan | 244/199 |
| 2051706 | 1/1981 | United Kingdom | 244/199 |

*Primary Examiner*—Peter M. Poon
*Assistant Examiner*—Tien Dinh
*Attorney, Agent, or Firm*—W. F. Fasse; W. G. Fasse

[57] ABSTRACT

An apparatus advantageously influences the wing root airflow along the wing root of an aircraft having a high lift system including leading edge slats provided on the main wings. The apparatus includes a respective vortex generator arranged on the inboard end of each leading edge slat in the area of the wing root, and further includes a respective transition fairing arranged on a separation edge that is let into the leading edge of the wing root and that borders along the inboard edge of the respective slat. The vortex generator is a rigid member fixed to the leading edge slat and may be in the shape of a horn, a disk, or a winglet. The transition fairing may be a rigid member fixed to the wing root along the separation edge, or may be a flexible elastic member that can be inflated to have a variable outer contour. The present system avoids the need of additional independently movable auxiliary flaps, and thus achieves a reduced weight, complexity, and maintenance requirement.

24 Claims, 2 Drawing Sheets

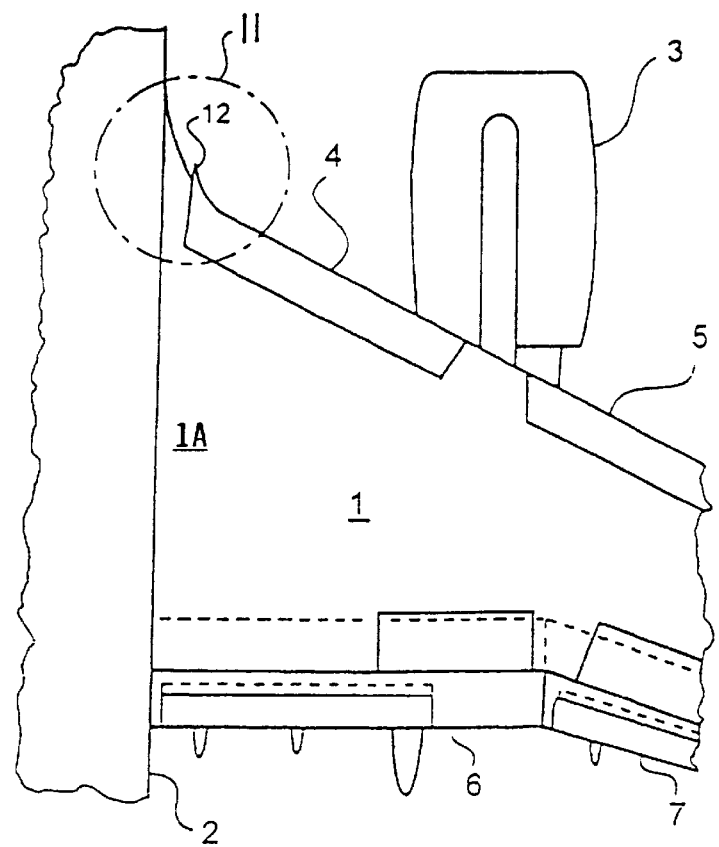

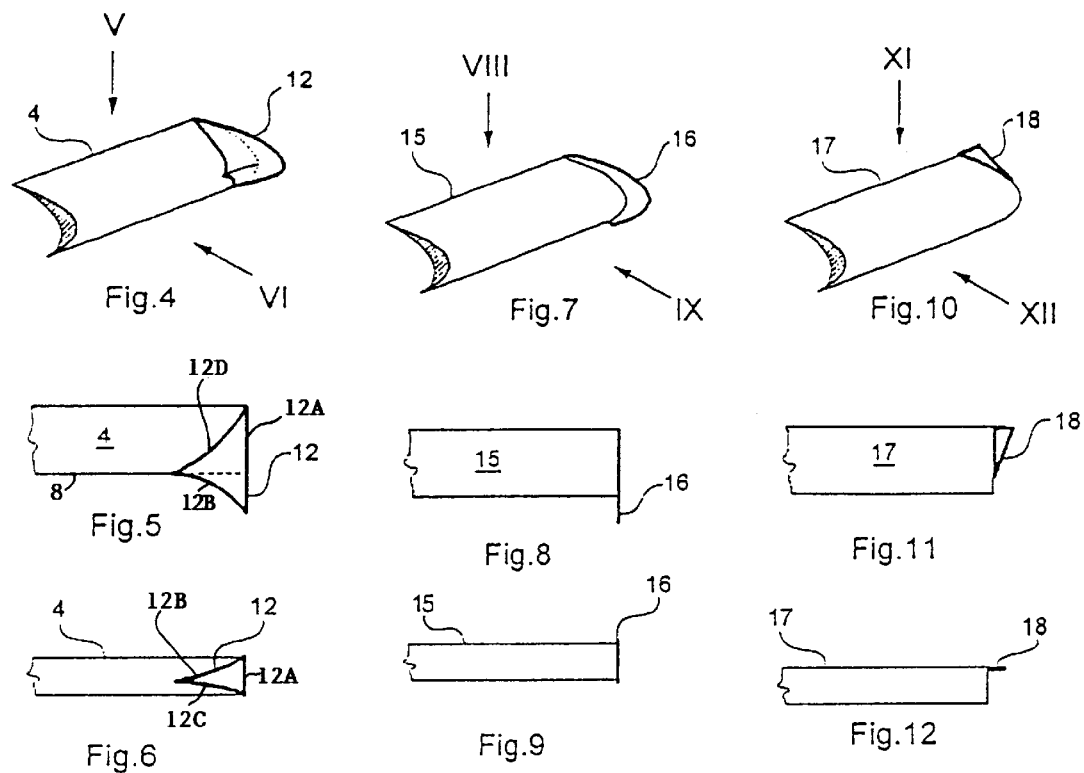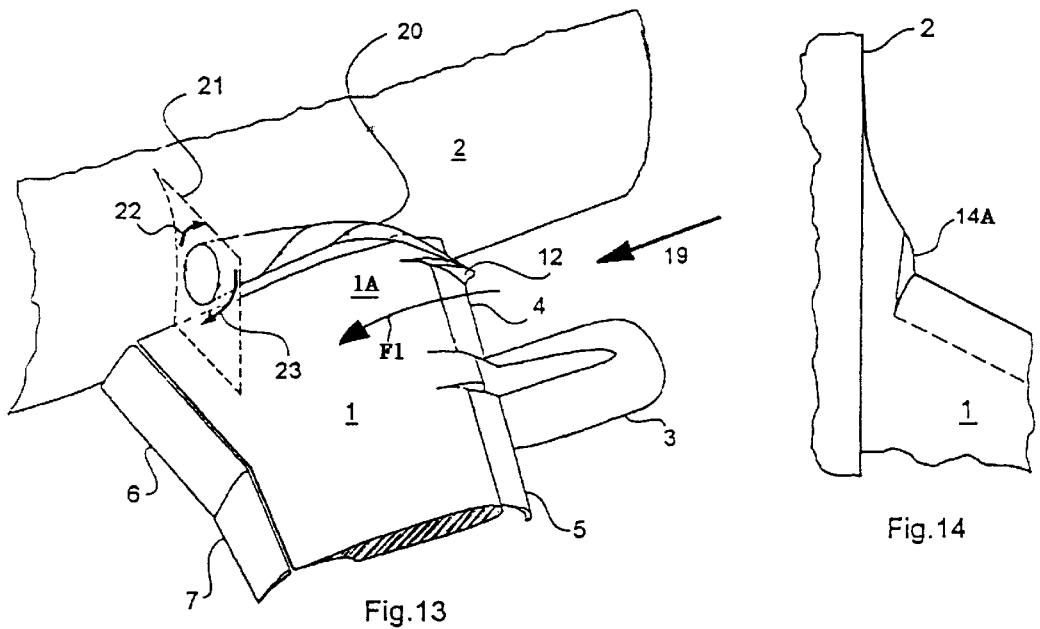

_US 6,152,404_

APPARATUS FOR INFLUENCING A WING ROOT AIRFLOW IN AN AIRCRAFT

PRIORITY CLAIM

This application is based on and claims the priority under 35 U.S.C. §119 of German Patent Application 197 19 922.4, filed on May 13, 1997.

FIELD OF THE INVENTION

The invention relates to an apparatus for influencing a wing root airflow over the root area of a wing in an aircraft equipped with a high lift system.

BACKGROUND INFORMATION

High lift systems are necessary for achieving the lowest possible take-off and landing speeds for transport aircraft. Namely, such high lift systems provide the high lift, or particularly the increased lift, that is required during slow flight. Typically, such a high lift system comprises landing flaps and leading edge slats arranged on the main wing of the aircraft. In this context, it is generally also necessary to provide measures for ensuring that an undisturbed wing root airflow will flow over the upper surface of the wing without separating therefrom, especially in the area of the wing-fuselage transition, i.e. at the wing root. In order to achieve this, additional local auxiliary flaps, such as Krueger flaps for example, are typically used. Such auxiliary flaps require additional drive mechanisms and linkages, and are therefore subject to possible malfunction and failure, and require increased maintenance, while also increasing the weight, cost and complexity of the aircraft, and particularly the high lift system.

SUMMARY OF THE INVENTION

In view of the above, it is an object of the invention to provide a system or apparatus for positively influencing the wing root airflow in an aircraft without using additional flaps or other moving parts. It is a more particular object of the invention to provide a system for generating and influencing a wing root vortex flow for maintaining an adherent airflow over the upper wing surface. The invention further aims to avoid or overcome the disadvantages of the prior art, and to achieve additional advantages, as will be apparent from the present description.

The above objects have been achieved in an apparatus for influencing the wing root airflow in an aircraft equipped with a high lift system including at least a leading edge slat provided on each of the right and left main wings. According to the invention, the present apparatus comprises respective vortex generators arranged at the respective inboard or fuselage-facing ends of the leading edge slats, and respective transition fairings respectively arranged at the gaps or separation areas between the slats and the body of the wing. In preferred embodiments, each vortex generator may have a horn-shape, a disk-shape or a winglet-shape. The transition fairing may be a fixed rigid member, or may have a variable geometry by being made of an elastic material enclosing an interior space that can be pressurized to different extents by introducing pressurized air or some other pressure medium therein.

The arrangement of a vortex generator and a transition fairing at the area of the inboard or fuselage-facing edge of each slat especially achieves the advantage of not requiring any additional movable flaps or the like. Thus, the inventive system, in comparison to prior art systems, achieves a reduced overall structural weight and a reduced maintenance requirement. Furthermore, in view of the structural simplicity of the inventive arrangement, it may easily be retrofitted on existing aircraft.

BRIEF DESCRIPTION OF THE DRAWINGS

In order that the invention may be clearly understood, it will now be described, in connection with example embodiments, with reference to the accompanying drawings, wherein:

FIG. 1 shows a partial plan view of an aircraft in the area of the wing root of a wing equipped with leading edge slats and trailing edge flaps;

FIG. 2 is an enlarged detail view of the detail area II shown in FIG. 1;

FIG. 3 is a view similar to that of FIG. 2, but showing the leading edge slat in an extended position, whereby a transition fairing is visible;

FIG. 4 is a schematic perspective view of a leading edge slat equipped with a vortex generator at an inboard end or edge thereof;

FIG. 5 is a plan view in the direction of arrow V of the leading edge slat shown in FIG. 4;

FIG. 6 is a front view in the direction of arrow VI of the leading edge slat shown in FIG. 4;

FIG. 7 is a schematic perspective view of a leading edge slat with a vortex generator in the form of an end disk provided on the inboard end of the slat;

FIG. 8 is a plan view taken in the direction of arrow VIII of the arrangement of FIG. 7;

FIG. 9 is a front view taken in the direction of arrow IX of the arrangement shown in FIG. 7;

FIG. 10 is a schematic perspective view of a leading edge slat equipped with a vortex generator in the form of an auxiliary winglet;

FIG. 11 is a plan view taken in the direction of arrow XI of the arrangement shown in FIG. 10;

FIG. 12 is a front view taken in the direction of arrow XII of the arrangement shown in FIG. 10;

FIG. 13 is a schematic perspective view of the area of the wing root at the transition between the wing and the fuselage, showing the generation of a vortex airflow along the wing root; and FIG. 14 is a schematic plan view of the wing root area of a wing equipped with another embodiment of a transition fairing.

DETAILED DESCRIPTION OF PREFERRED EXAMPLE EMBODIMENTS AND OF THE BEST MODE OF THE INVENTION

FIG. 1 shows a portion of an aircraft including a fuselage 2 and a main wing 1 connected to the fuselage 2 along a wing root 1A. A jet engine 3 is mounted on the wing 1. Particularly, FIG. 1 shows only the area of the transition between the wing root and the fuselage on the right side of the aircraft, but it should be understood that the same elements as illustrated form a matching pair on the left side of the aircraft which is not illustrated. The illustrated right main wing 1 is equipped with a high lift system including slats arranged on the leading edge, and right side landing flaps 6 and 7 arranged along the trailing edge. Particularly, the leading edge slats are divided into an inboard slat 4 and an outboard slat 5 due to the location of the engine 3 in the illustrated example embodiment. A vortex generator 12 is arranged on the inboard end of the slat 4, i.e. the end of the slat 4 closer to the fuselage 2. The vortex generator 12 may be fabricated from any known materials used in aircraft construction, such as sheet aluminum or other metal alloys, or fiber reinforced composite materials.

FIG. 2 shows the detail area II of FIG. 1, and particularly shows the main wing 1, the fuselage 2, and the leading edge slat 4 that includes a leading edge 8 and a trailing edge 9 as well as an inboard terminal edge 10 on the fuselage-facing end of the slat 4. The terminal edge 10 of the slat 4 borders along a separation edge 11 that is notched or let into the leading edge of the wing 1 in the root area 1A of the wing 1. The leading edge 8 of the slat 4 extends along a substantially straight leading edge outline U over most of its length, but has a curved portion 4A into which the straight leading edge U transitions near the terminal edge 10 at the inboard end of the slat 4. On the other hand, the body of the main wing has a straight leading edge that transitions into a curved portion 2A in the area of the wing root 1A, and particularly where the wing root 1A transitions into the fuselage 2. The curved-portion 2A of the wing root is offset from and/or more gently curved than the curved portion 4A of the slat 4, so that the curved portion 4A forms a projecting point or nose of a horn-shaped vortex generator 12. Furthermore, this arrangement results in a step-wise transition having the height H, by which the vortex generator 12 formed by the curved portion 4A protrudes beyond the curved portion 2A at the area of the separation edge 11.

FIG. 2 shows the leading edge slat 4 in a retracted position, which typically pertains when the aircraft is in its cruise flight configuration. In this configuration, the leading edge slat 4 has an aerodynamic resistance and an aerodynamic behavior, practically the same as any conventional leading edge slat in the retracted position.

FIG. 3 schematically shows the leading edge flap 4 in an extended position, in which the slat 4 has been driven outward in the direction of arrow A by an extension distance V, by a drive mechanism which is not shown. This extension motion A is carried out in a direction that is substantially perpendicular to the leading edge 13 of the main wing 1, and thus includes a component of motion directed away from the fuselage 2. As a result, extending the slat 4 causes a gap having the width S between the inboard terminal edge 10 of the slat 4 and the separation edge 11 of the wing root 1A. Furthermore, extending the leading edge slat 4, together with the extension of the landing flaps, achieves the typical increase in lift on the one hand, but also causes the vortex generator 12 to generate a vortex on the other hand. More particularly, the effective incident wind approaches in the direction F opposite the flight direction, and the vortex generator 12 generates a right-hand or clockwise rotating vortex, as seen in the flight direction, which is introduced into the wing root airflow. This vortex flow has a stabilizing effect on the wing root airflow that exists during slow flight of the aircraft.

The above described gap having the width S, which results when the slat 4 is extended in the direction A, generally would form an aerodynamically disadvantageous region that would tend to cause airflow disturbances downstream thereof in the over-wing airflow along the wing root area 1A. The separation edge 11 predominantly contributes to these airflow disturbances. Namely, here there is a tendency to cause a flow disturbance or even to generate a vortex that destabilizes the airflow downstream thereof and reduces the maximum attainable lift, especially at large angles of attack.

On the other hand, at the inboard terminal edge 10 of the slat 4, generally even without a vortex generator 12, there is a tendency to form a right-hand or clockwise rotating pipe or cone vortex, which advantageously influences the airflow along the wing root 1A in contrast to the above described airflow disturbances. By purposely configuring or adding a vortex generator 12 on the inboard terminal edge 10 of the slat 4, this positive effect is enhanced and strengthened.

By carrying out experiments to determine optimal configurations for the vortex generator 12, the inventors determined that the effect was considerably improved when the airflow disturbance resulting from the area between the inboard terminal edge 10 of the slat 4 and the separation edge 11 of the wing root 1A was minimized by aerodynamically advantageously configuring this area by means of a transition fairing 14. Contrary to expectations, it was found that the vortex generated or enhanced by the vortex generator 12 rotated evermore strongly, the more aerodynamically favorably the transition fairing 14 was configured.

The transition fairing 14 as shown in FIG. 3 achieves a gradual geometry transition from the wing root separation edge 11 to the leading edge 13 of the main wing 1, rather than a sharp step-wise or jump transition that would exist without the fairing 14. The combined effect of the above described vortex generator 12 on the extended slat 4 in cooperation with the transition fairing 14 is to create a stabilizing vortex flow over the upper surface of the wing root area 1A, which stabilizes the airflow in this area and prevents a premature separation of the airflow from the upper surface of the wing in this critical area. In the present embodiment, the transition fairing 14 may be fabricated of any known materials used in the art of aircraft construction, such as aluminum or other metal alloy sheets, or fiber reinforced composite materials. Moreover, in this embodiment, the transition fairing 14 has a rigid geometry with a straight line profile and is rigidly secured to the wing root area separation edge 11.

FIGS. 4 to 6 schematically show the leading edge slat 4 according to FIGS. 1 to 3, and particularly the horn-shaped vortex generator 12 arranged on the slat 4. In this context, FIG. 4 is a perspective view, FIG. 5 is a top plan view, and FIG. 6 is a front elevation view, of the inboard end of the slat 4 with the vortex generator 12 arranged thereon. As can be seen in FIGS. 4 to 6, the horn-shaped vortex generator 12 has a substantially flat side 12A along the inboard terminal edge 10 of the slat 4, and two curved surfaces 12B and 12C meeting one another in a cusp on the side of the forward protruding portion of the vortex generator 12 facing away from the fuselage. From the nose of the vortex generator protruding forward of the leading edge of the slat 4 toward the trailing edge thereof, the protruding portion of the vortex generator 12 has a curved tapering surface that meets the slat 4 along a curved line 12D.

FIGS. 7 to 9 show another embodiment of a vortex generator 16, namely a disk-shaped vortex generator 16 mounted on a leading edge slat 15. FIG. 7 is a perspective view, FIG. 8 is a top plan view, and FIG. 9 is a front elevation view. This disk-shaped vortex generator 16 is a substantially flat plate arranged on the inboard terminal edge 10 of the leading edge slat 15. The flat disk-shaped plate has an oval curved contour protruding forward from the slat 15 and protruding only slightly above and below the slat 15, as shown in FIGS. 8 and 9.

FIGS. 10 to 12 show another configuration or embodiment of a vortex generator 18, and particularly a vortex generator 18 in the form of an auxiliary winglet arranged on the inboard end of the leading edge slat 17. FIG. 10 is a perspective view, while FIG. 11 is a top plan view, and FIG.

12 is a front elevation view. As seen in FIGS. 11 and 12, the winglet-shaped vortex generator 18 is a substantially flat triangular or delta-shaped winglet that protrudes from the inboard terminal edge 10 of the slat 17, substantially along the plane of the upper surface of the slat 17. The triangular shape of the winglet tapers to a point in the forward flight direction.

In each of the different geometric configurations of the vortex generators 12, 16 and 18 shown in FIGS. 4 to 12, the general principles of the vortex generator are consistently maintained. Each of these vortex generators 12, 16 and 18 is a simple, rigid aerodynamic flow influencing member fixed to the inboard terminal edge of the leading edge slat. As such, these vortex generators 12, 16 and 18 are not independently movable auxiliary flaps, and in fact do not include any movable parts. Nonetheless, these vortex generators have been proven to provide very effective means, in cooperation with the transition fairing 14, for generating a vortex flow and advantageously influencing the wing root airflow in an aircraft.

FIG. 13 is a perspective view showing the wing root area of the right main wing 1, where it joins the fuselage 2 of an aircraft. The wing 1 is further equipped with an engine 3, leading edge slats 4 and 5, landing flaps 6 and 7, and a vortex generator 12. In the illustrated configuration, the slats 4 and 5 as well as the flaps 6 and 7 are extended, for example a landing approach configuration. The effective airflow 19 in this situation is illustrated by the arrow 19. In this configuration or setting of the slats, the vortex generator 12 arranged at the inboard end of the slat 4, cooperating with the associated transition fairing 14, generates a vortex flow downstream of the vortex generator 12. Thus, the vortex flow 20 flows over the separation-critical or separation-endangered area of the upper surface of the wing 1 along the wing root area 1A. Alternatively, a previously existing vortex flow is amplified or reinforced by the effect of the vortex generator 12. The vortex flow generated in this manner particularly has the form of a pipe or conical vortex 20.

If the velocity vectors of this vortex flow 20 are projected into a plane 21 extending perpendicularly to the airflow direction 19, it is apparent that the vortex flow provides a right-hand or clockwise rotating flow when seen in the direction of flight, as shown by the two rotation arrows 22 and 23 in the imaginary plane 21. Alternatively, viewed from the vortex generator 12 in the airflow direction, the vortex 20 has a counterclockwise spiraling flow. The vortex flow rotating in this direction has the effect of directing the main airflow over the wing toward the wing root area and toward the fuselage, and thereby stabilizes the main airflow along the upper surface of the wing 1 in the root area 1A. In effect, the clockwise rotating flow (as seen in the flight direction) constantly pushes the main airflow F1 in a direction down onto the wing 1 and particularly toward the junction of the wing root 1A with the fuselage 2. This influence helps to prevent a separation of the main airflow F1 from the upper surface of the wing, even at large angles of attack. It should be understood that the inventive arrangement on the left side of the aircraft will cause a vortex flow that rotates in the opposite direction, to achieve the same airflow stabilizing effect on the left wing.

Without the inventive arrangement of the vortex generator and the transition fairing, the main airflow over the wing typically begins to separate from the upper surface of the wing, especially at the wing root area, already at relatively low angles of attack. Such airflow separation from the wing leads to a collapse of the lift, and a drastic increase in the aerodynamic resistance, and ultimately leads to a wing stall.

According to a further embodiment of the invention, the transition fairing may have a variable geometry rather than the fixed geometry or configuration described above. FIG. 14 is a view generally similar to that of FIG. 3, showing a main wing 1 and the aircraft fuselage 2, but with the leading edge flap 4 omitted for the sake of clarity. In the embodiment of FIG. 14, a transition fairing 14A having a rounded or curved contour is arranged on the separation edge 11 of the wing root area 1A that borders along the inboard terminal edge of the slat. This transition fairing 14A is made of a rubber elastic material enclosing a hollow space therein. The fairing 14A is elastically deformable or reconfigurable by selectively introducing a pressurized medium into the hollow interior space of the fairing 14A. Thus, when the leading edge slat 4 has been moved into its extended position, a pressurized medium is introduced into the hollow interior space of the transition fairing 14A, so that the fairing 14A expands outwardly to have the rounded or curved outer contour as shown in FIG. 14. This serves to at least partially close the gap between the extended slat and the separation edge 11 of the wing root 1A. More importantly, the rounded or curved configuration of the expanded fairing 14A further reduces the aerodynamically disruptive influence of the sharp step of the separation edge 11 on the wing root airflow.

By provision of an electrically controlled valve, or any other known means (not shown), it is ensured that the supply of pressurized medium to the hollow interior space within the fairing 14A is controlled in cooperation with the operation of the leading edge slat. Namely, on the one hand it is ensured that the fairing 14A will be depressurized, deflated and retracted before the slat is retracted, and on the other hand the fairing 14A will only be inflated and extended once the slat has been extended.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft having a fuselage, a wing connected to said fuselage at a root area of said wing, and a leading edge slat movably arranged at a leading edge of said wing so as to be extendable to an extended position and retractable to a retracted position relative to said wing, an improved apparatus for influencing a wing root airflow over said wing at said root area, wherein said wing has a separation edge let into said leading edge adjacent said root area, an inboard edge of said slat borders along said separation edge when said slat is in said retracted position, and said improved apparatus comprises a vortex generator arranged on said slat at said inboard edge thereof and a transition fairing arranged on said wing at said separation edge so as to provide an aerodynamic transition from said separation edge toward said slat.

2. The improved apparatus for influencing a wing root airflow in the aircraft according to claim 1, wherein said vortex generator is a rigid member rigidly fixed to said slat.

3. The improved apparatus for influencing a wing root airflow in the aircraft according to claim 1, wherein said vortex generator does not include any component that is movable independently of said slat.

4. The improved apparatus for influencing a wing root airflow in the aircraft according to claim 1, wherein said vortex generator protrudes forwardly from a straight line leading edge of said slat, and does not protrude laterally toward said fuselage from said inboard edge of said slat.

5. The improved apparatus for influencing a wing root airflow in the aircraft according to claim 1, wherein said vortex generator protrudes laterally toward said fuselage from said inboard edge of said slat, and does not protrude forwardly from a straight line leading edge of said slat.

6. The improved apparatus for influencing a wing root airflow in the aircraft according to claim 1, wherein said vortex generator has a horn shape protruding forwardly from said slat.

7. The improved apparatus for influencing a wing root airflow in the aircraft according to claim 6, wherein said horn shape includes a forward facing nose, a flat surface extending parallel to said inboard edge of said slat and extending to said nose, and an upper curved surface and a lower curved surface adjoining one another and extending between said nose and said slat.

8. The improved apparatus for influencing a wing root airflow in the aircraft according to claim 6, wherein said leading edge of said wing comprises a straight leading edge portion and a curved leading edge portion that curvedly transitions to said fuselage along said wing root, said horn shape of said vortex generator protrudes forwardly beyond said straight leading edge portion and said curved leading edge portion when said slat is in said retracted position, and said horn shape of said vortex generator includes a curved forward edge with a radius of curvature smaller than that of said curved leading edge portion.

9. The improved apparatus for influencing a wing root airflow in the aircraft according to claim 1, wherein said vortex generator has a disk shape.

10. The improved apparatus for influencing a wing root airflow in the aircraft according to claim 9, wherein said vortex generator comprises a flat plate having said disk shape, wherein said flat plate is arranged on and parallel to said inboard edge of said slat and protrudes forwardly from a straight line leading edge of said slat.

11. The improved apparatus for influencing a wing root airflow in the aircraft according to claim 1, wherein said vortex generator has a winglet shape Protruding laterally from said inboard edge of said slat toward said fuselage.

12. The improved apparatus for influencing a wing root airflow in the aircraft according to claim 11, wherein said vortex generator comprises a flat plate having said winglet shape, wherein said flat plate is arranged to extend from said inboard edge of said slat parallel and flush with an upper slat surface of said slat.

13. The improved apparatus for influencing a wing root airflow in the aircraft according to claim 11, wherein said winglet shape comprises a triangular winglet shape, and does not protrude forward of a leading edge of said slat.

14. The improved apparatus for influencing a wing root airflow in the aircraft according to claim 1, wherein said vortex generator is so configured and arranged as to generate and increase a vortex airflow that rotates with a rotation component along said wing toward said root area and said fuselage when said slat is in said extended position.

15. The improved apparatus for influencing a wing root airflow in the aircraft according to claim 14, wherein said wing is a right wing of said aircraft, and wherein said vortex airflow rotates clockwise when viewed in a forward flight direction of said aircraft.

16. The improved apparatus for influencing a wing root airflow in the aircraft according to claim 1, wherein said transition fairing is a rigid member rigidly fixed to said wing on said separation edge.

17. The improved apparatus for influencing a wing root airflow in the aircraft according to claim 1, wherein said transition fairing comprises an adjustable fairing member having a variable geometry.

18. The improved apparatus for influencing a wing root airflow in the aircraft according to claim 17, wherein said adjustable fairing member comprises a rubbery elastic material with a hollow space enclosed therein, and is adapted to have a pressurized medium selectively introduced into said hollow space so as to elastically expand said adjustable fairing member.

19. The improved apparatus for influencing a wing root airflow in the aircraft according to claim 1, wherein said aircraft including said wing and said slat is a previously existing aircraft, and said vortex generator and said transition fairing are retrofit mounted on said wing.

20. The improved apparatus for influencing a wing root airflow in the aircraft according to claim 1, wherein said vortex generator is a rigid member that is rigidly fixed to said slat and that protrudes in at least one direction selected from a first direction forwardly from a leading edge of said slat and a second direction laterally from said inboard edge of said slat, said leading edge of said wing includes a straight leading edge portion and a curved root leading edge portion separated and offset from each other by said separation edge, said transition fairing has such a contour and is arranged so as to transition smoothly from said curved root leading edge portion to said straight leading edge portion of said wing at said separation edge, and said vortex generator and said transition fairing together are so configured and arranged as to generate and increase a vortex airflow that rotates in a direction with a rotation component directed along said wing toward said root area and said fuselage.

21. The improved apparatus for influencing a wing root airflow in the aircraft according to claim 1, wherein said vortex generator is so configured and arranged to form a contour discontinuity of an outer surface contour of said improved apparatus both when said slat is in said extended position and when said slat is in said retracted position.

22. The improved apparatus for influencing a wing root airflow in the aircraft according to claim 1, wherein said vortex generator protrudes outwardly beyond an outer contour of said slat when said slat is in said retracted position.

23. The improved apparatus for influencing a wing root airflow in the aircraft according to claim 1, wherein said vortex generator is arranged and provided only at said inboard edge of said slat.

24. In an aircraft having a fuselage, a wing connected to said fuselage at a root area of said wing, and a leading edge slat movably arranged at a leading edge of said wing so as to be extendable to an extended position and retractable to a retracted position relative to said wing, an improved apparatus for influencing a wing root airflow over said wing at said root area, wherein said wing has a separation edge let into said leading edge adjacent said root area, an inboard edge of said slat borders along said separation edge when said slat is in said retracted position, and said improved apparatus comprises means for generating a vortex in said wing root airflow arranged on said slat at said inboard edge thereof and a transition fairing arranged on said wing at said separation edge so as to provide an aerodynamic transition from said separation edge toward said slat.

* * * * *